(12) United States Patent
Courtney et al.

(10) Patent No.: US 9,473,309 B2
(45) Date of Patent: Oct. 18, 2016

(54) SYSTEM AND METHOD FOR PROVIDING A TRUST FRAMEWORK USING A SECONDARY NETWORK

(71) Applicants: BlackBerry Limited, Waterloo (CA); Certicom Corp., Mississauga (CA)

(72) Inventors: Sean Alexander Courtney, Hamilton (CA); Matthew John Campagna, Ridgefield, CT (US); George Ross Staikos, Toronto (CA); Alexander Truskovsky, Waterloo (CA)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 0 days.

(21) Appl. No.: 13/793,166

(22) Filed: Mar. 11, 2013

(65) Prior Publication Data

US 2014/0215206 A1    Jul. 31, 2014

Related U.S. Application Data

(60) Provisional application No. 61/758,166, filed on Jan. 29, 2013.

(51) Int. Cl.
*H04L 29/06* (2006.01)
*H04L 9/32* (2006.01)
*H04W 12/04* (2009.01)

(52) U.S. Cl.
CPC ......... *H04L 9/3268* (2013.01); *H04L 63/0281* (2013.01); *H04L 63/18* (2013.01); *H04W 12/04* (2013.01)

(58) Field of Classification Search
CPC ..... G06F 21/30; H04W 12/06; H04L 9/3265

USPC ........... 713/156–153; 726/1, 5, 28; 709/200
See application file for complete search history.

(56) References Cited

U.S. PATENT DOCUMENTS 6,442,688 B1 *  8/2002  Moses et al. ................. 713/158
6,856,800 B1 *  2/2005  Henry .................. H04W 12/06
                                                              380/247

(Continued)

FOREIGN PATENT DOCUMENTS

WO     03/079627      9/2003
WO     2012/068094    5/2012

OTHER PUBLICATIONS

Shen, Shigen and Guangxue Yue; "Unified Certificate Validation System DNS-OSCP"; International Symposium on Electronic Commerce and Security; Aug. 3, 2008; pp. 394-397.

(Continued)

*Primary Examiner* — Dede Zecher
*Assistant Examiner* — Viral Lakhia
(74) *Attorney, Agent, or Firm* — Fish & Richardson P.C.

(57) ABSTRACT

A system for providing security services to a mobile device where the mobile device is in communication with a public network through a first network path that is subject to interference by a third party. The system includes a security server and a private network. The security server is operative to communicate with the mobile device through the private network. The security server is also operative to communicate with the public network through a second network path that is less susceptible to the interference by the third party than is the first network path. The security server communicates with the public network through the second network path to provide security services to the mobile device that are delivered over the private network.

17 Claims, 8 Drawing Sheets

(56) References Cited

U.S. PATENT DOCUMENTS

| | | | |
|---|---|---|---|
| 7,395,428 B2 | 7/2008 | Williams et al. | |
| 7,448,080 B2* | 11/2008 | Karjala et al. | 726/15 |
| 7,761,703 B2 | 7/2010 | Little et al. | |
| 8,086,848 B2* | 12/2011 | Thayer et al. | 713/156 |
| 8,181,262 B2* | 5/2012 | Cooper et al. | 726/28 |
| 8,402,525 B1* | 3/2013 | Shah | H04L 41/0273 726/28 |
| 8,458,462 B1* | 6/2013 | Hanna | 713/163 |
| 8,494,485 B1* | 7/2013 | Broch | H04L 9/3263 370/329 |
| 8,595,484 B2* | 11/2013 | Thomas et al. | 713/156 |
| 8,621,204 B2* | 12/2013 | Edstrom et al. | 713/156 |
| 8,925,066 B2* | 12/2014 | Benari et al. | 726/12 |
| 9,002,018 B2* | 4/2015 | Wilkins | H04L 9/006 380/281 |
| 2003/0014629 A1* | 1/2003 | Zuccherato | 713/156 |
| 2004/0093419 A1* | 5/2004 | Weihl et al. | 709/229 |
| 2004/0117615 A1* | 6/2004 | O'Donnell | G06F 21/10 713/155 |
| 2005/0055397 A1* | 3/2005 | Zhu et al. | 709/200 |
| 2006/0174106 A1 | 8/2006 | Bell et al. | |
| 2006/0240804 A1 | 10/2006 | Backholm et al. | |
| 2006/0262772 A1* | 11/2006 | Guichard et al. | 370/351 |
| 2009/0063357 A1* | 3/2009 | Munger | G06Q 50/188 705/80 |
| 2009/0132813 A1* | 5/2009 | Schibuk | G06Q 20/223 713/158 |
| 2010/0083347 A1 | 4/2010 | Hinton | |
| 2010/0115581 A1* | 5/2010 | Goldschlag et al. | 726/1 |
| 2010/0161971 A1* | 6/2010 | Thayer | H04L 63/0823 713/156 |
| 2011/0072270 A1* | 3/2011 | Little et al. | 713/175 |
| 2011/0113244 A1* | 5/2011 | Chou et al. | 713/168 |
| 2011/0154021 A1* | 6/2011 | McCann et al. | 713/153 |
| 2012/0159148 A1* | 6/2012 | Behren | G06Q 20/3552 713/150 |
| 2012/0204032 A1* | 8/2012 | Wilkins | H04L 9/006 713/170 |
| 2012/0297473 A1* | 11/2012 | Case et al. | 726/10 |
| 2013/0067552 A1* | 3/2013 | Hawkes et al. | 726/7 |

OTHER PUBLICATIONS

International Search Report and Written Opinion of International Application No. PCT/US2013/030169 on Oct. 14, 2013; 14 pages.

Sengupta, S. (Aug. 31, 2011). In Latest Breach, Hackers Impersonate Google to Snoop on Users in Iran. New York Times, p. B4.

Richmond, R. (Apr. 6, 2011). An Attack Sheds Light on Internet Security Holes. New York Times, p. B3.

Pinkas, D., Housley, R. Delegate Path Validation and Delegated Path Discovery Protocol Requirements, RFC 3379, IETF, Sep. 2002.

Adams, C., Ankney, R., Galperin, S., Malpani, A., Myers, M., X.509 Internet Public Key Infrastructure Online Certificate Status Protocol—OCSP, RFC 2560, Jun. 1999.

Boeyen, B., Cooper, D., Farrell, S., Housley, R., Polk, W., Santesson, S., Internet X.509 Public Key Infrastructure Certificate and Certificate Revocation List (CRL) Profile, RFC 5280, IETF, May 2008.

Postel, J., Domain Name System Structure and Delegation, RFC 1591, IETF, Mar. 1994.

Open Mobile Alliance, Enabler Release Definition for OMA Device Management Candidate Version 2.0—May 31, 2012.

Open Mobile Alliance, Device Management Requirements Candidate Version 2.0—Dec. 20, 2011.

Open Mobile Alliance, Device Management Architecture Candidate Version 2.0—May 31, 2012.

\* cited by examiner

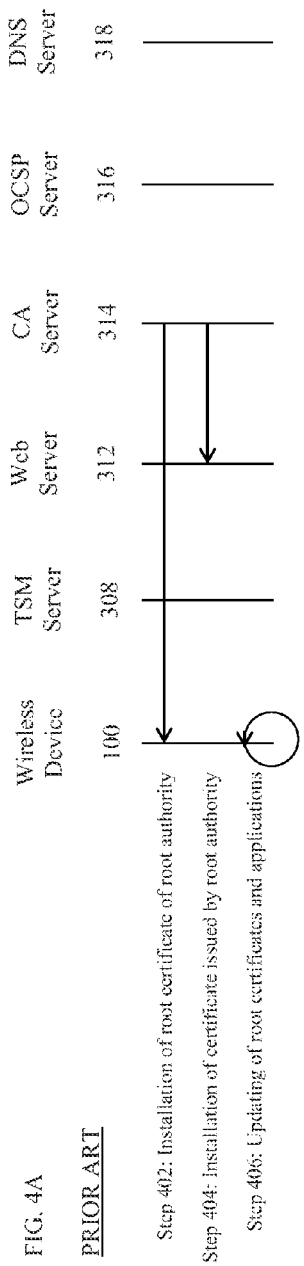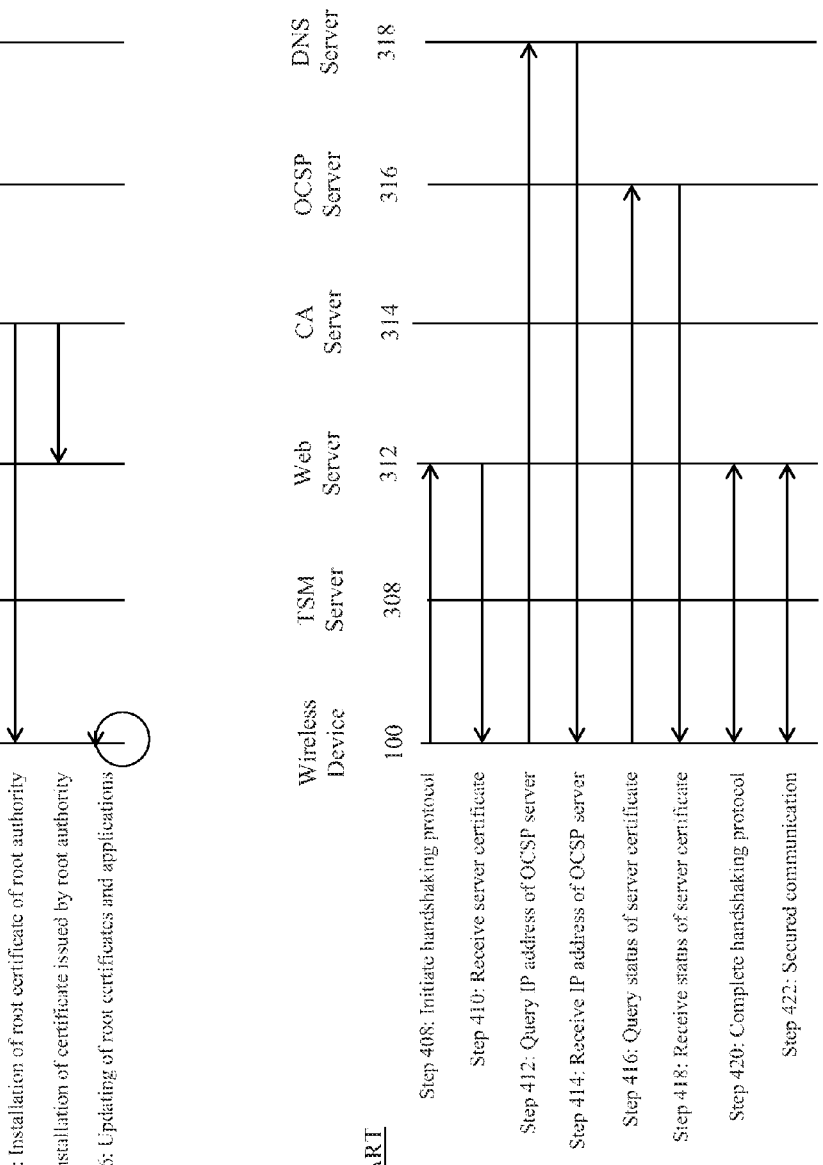
FIG. 4A
PRIOR ART
FIG. 4B
PRIOR ART

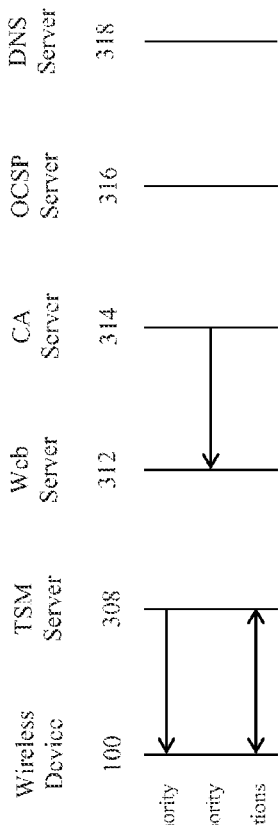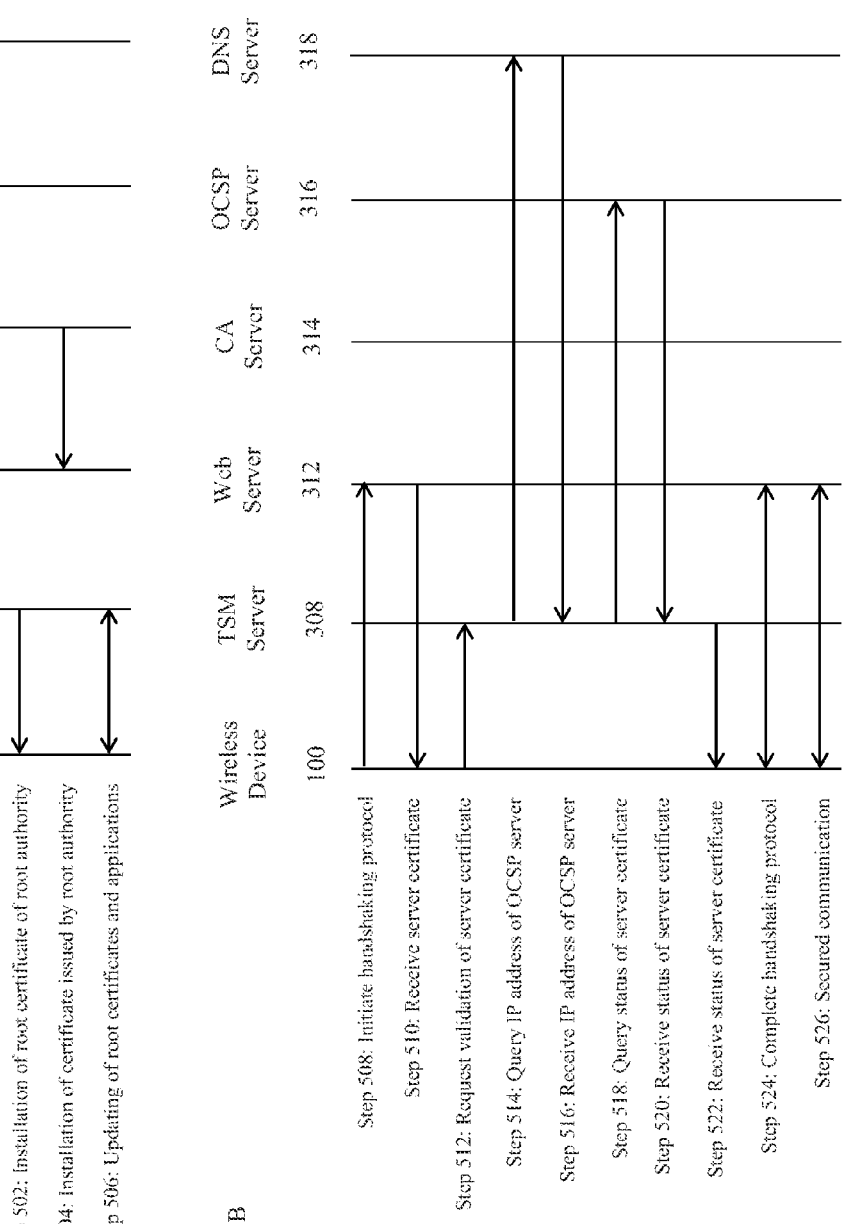

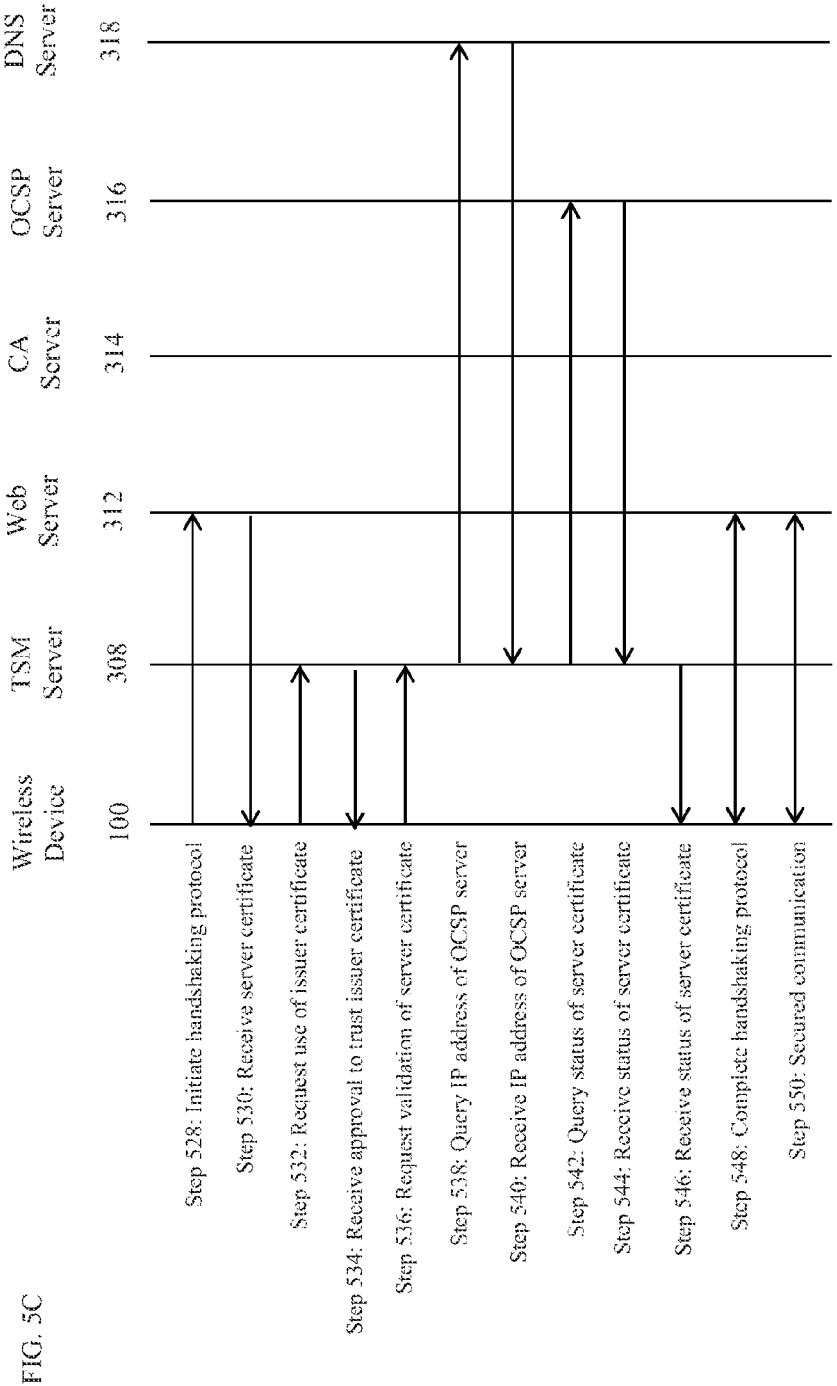

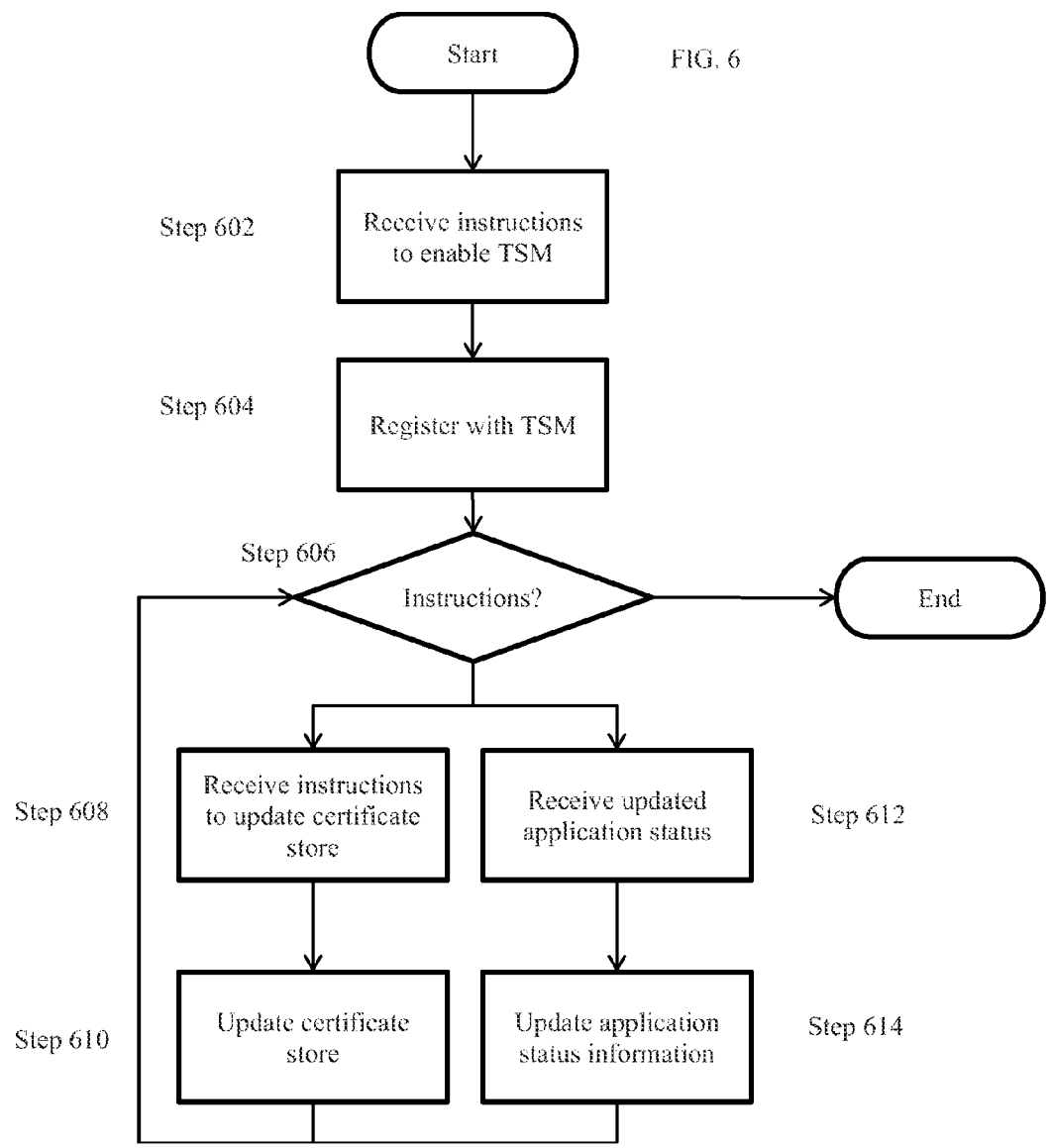

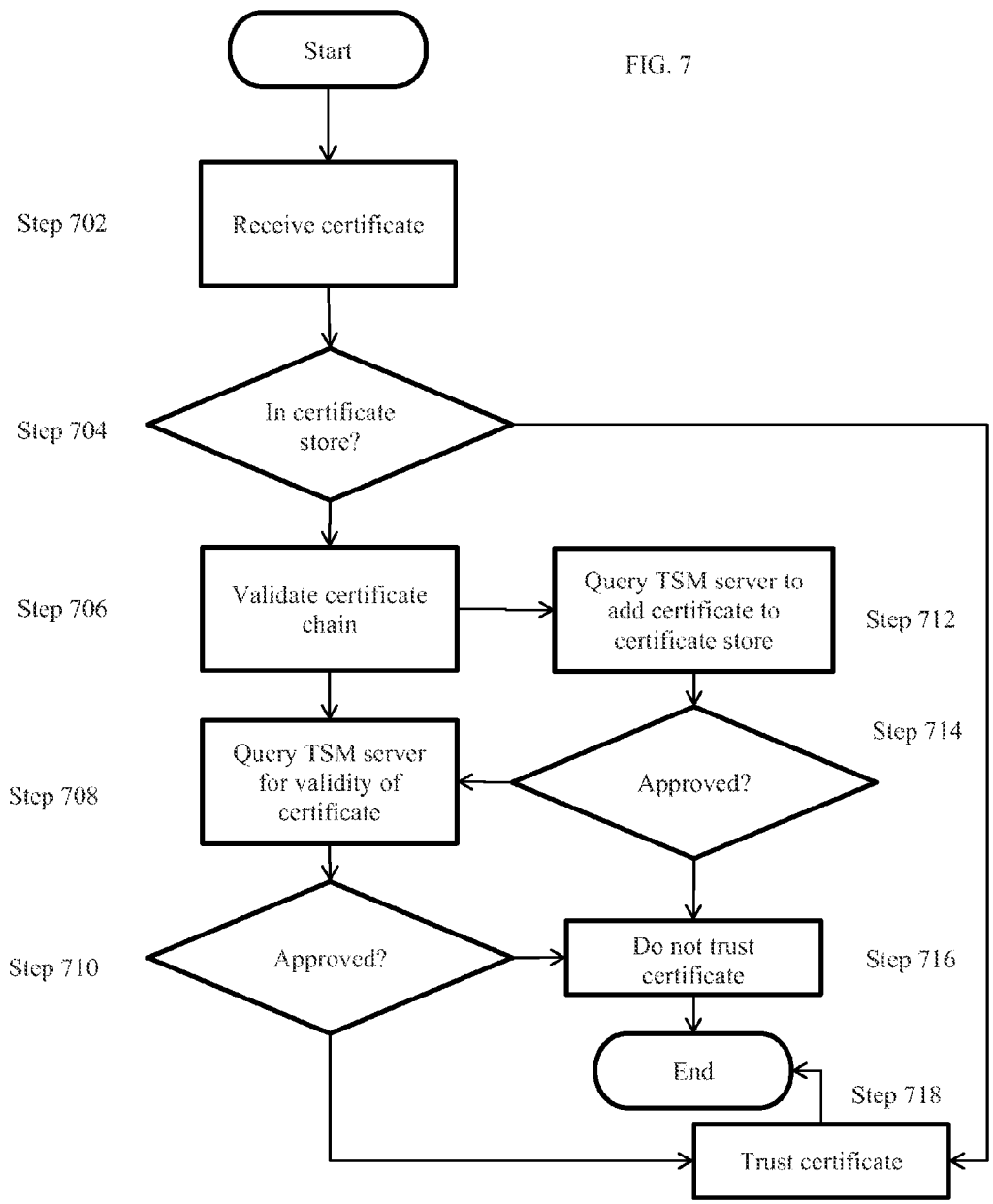

SYSTEM AND METHOD FOR PROVIDING A TRUST FRAMEWORK USING A SECONDARY NETWORK

FIELD OF THE DISCLOSURE

The present disclosure relates generally to the field of cryptographic signatures, and more particularly to a system and method for providing a certificate based trust framework using a secondary network.

BACKGROUND

Public key cryptographic systems are designed to provide secure communication over insecure networks, including between parties that may not have had any previous communication. Such systems typically rely upon a public key infrastructure (PKI) comprising software, hardware, communication protocols, and related policies and procedures, one such example being the X.509 standard published by the International Telecommunication Union.

There are two common trust models used as part of a PKI. A web of trust model is based on a decentralized network and is used as part of systems such as Pretty Good Privacy™ (PGP). In contrast, a hierarchical model relies upon certain entities in the trust framework being commonly trusted by multiple parties, such mutual trust in such entities underpinning the system. Regardless of which trust model is used, when two parties interact for the first time by means of a PKI, each party uses the trust framework of a PKI in order to decide whether or not to trust the other party as being who they claim to be. This is commonly used, for example, in the context of web browsers accessing web servers over the Internet.

A common aspect of a typical PKI comprises digital certificates that use cryptographic protocols to reliably link certain information with an identity. For example, the X.509 standard defines public key certificates as comprising, among other things, a serial number, the identity of the issuer of the certificate, the subject (i.e. the entity identified by the certificate), the digital signature of the issuer, and a public key of the subject.

In a hierarchical PKI, certificates are divided into three types: end certificates, intermediate certificates, and root certificates. Root certificates and intermediate certificates are used to identify certificate authorities (CAs), that is, an entity in a PKI that issues digital certificates to third parties. Root certificates are self-signed, that is, the identity of the issuer of the certificate is the same as the subject of the certificate, in this case, a root CA. These certificates must either be axiomatically trusted or not trusted by a given third-party. Intermediate certificates are certificates issued to an intermediate CA by a root CA. End certificates are issued by certificate authorities to end users, such as a website host. In such a hierarchical PKI, whether a given end certificate is trusted by a particular individual is based on whether that particular individual trusts the issuer of the certificate (or any other issuer further up the certificate chain). In this way, individuals, upon receiving a certificate purporting to be of an arbitrary third-party (i.e. an end certificate), may traverse the certificate chain, starting from the end certificate, through one or more intermediate certificates, and terminating at a root certificate. If at any point an intermediate certificate or the root certificate is trusted, then the end certificate is similarly trusted. Such analysis of a certificate and its corresponding certificate chain, together with further security protocols as described herein, is commonly known to those skilled in the relevant art as validating a certificate.

Prior art PKIs may include mechanisms to provide additional security. Certificate revocation lists (CRLs) are lists published by certificate authorities to give public notice of certain certificates that they issued that are no longer valid (i.e. should no longer be trusted by third parties). Typically, in the context of the Internet, a digital certificate will include an Uniform Resource Locator (URL) to download a corresponding CRL, the assumption being that a given third party, upon receiving the certificate and deciding whether to trust it by traversing the certificate chain, as part of the validation process, will also access the CRL through the provided URL to determine whether or not the certificate has been revoked.

Another illustrative protocol, the Online Certificate Status Protocol (OCSP), operates by means of a query/response mechanism to similarly provide the status of a particular certificate. A corresponding OCSP responder may be specified by a digital certificate, the assumption again being that a given third party, upon receiving the certificate and deciding whether to trust it by traversing the certificate chain, as part of the validation process, will also query the OCSP responder through the provided URL to determine whether or not the certificate has been revoked. Still another well-known protocol for validating and reviewing the status of a given certificate is delegated path validation (DPV).

A common limitation to these existing mechanisms in the context of the Internet is that they depend upon the correct operation of underlying Internet services, particularly that of the Domain Name System (DNS) and network traffic routing more generally. For example, if a third-party (such as a nation-state) has the capability to return an incorrect Internet Protocol (IP) address to a given individual in response to a DNS query (e.g. in the course of attempting to access a specified URL to download a particular CRL), such third-party could prevent the individual from learning that a given certificate has been revoked. A similar consequence would arise if a third-party has the capability of interfering with the routing of network traffic between the given individual and, for example, an OCSP responder.

BRIEF DESCRIPTION OF THE DRAWINGS

Non-limiting examples of various embodiments of the present disclosure will next be described in relation to the drawings, in which:

FIG. 4A is a signal diagram depicting a prior art method for installing and updating certificates as part of a certificate based authentication framework.

FIG. 4B is a signal diagram depicting a prior art method for negotiating transport level security as part of a certificate based authentication framework.

FIG. 5A is a signal diagram depicting a method for installing and updating certificates and applications in accordance with an illustrative embodiment.

FIG. 5B is a signal diagram depicting a method for negotiating transport level security in accordance with an illustrative embodiment.

FIG. 5C is a signal diagram depicting a method for negotiating transport level security in accordance with an illustrative embodiment wherein the issuer certificate is not in a local certificate store.

FIG. 6 is a flow diagram depicting a setup and ongoing update operation in accordance with an illustrative embodiment.

FIG. 7 is a flow diagram depicting a certificate validation operation in accordance with an illustrative embodiment.

DETAILED DESCRIPTION

Figure 1:
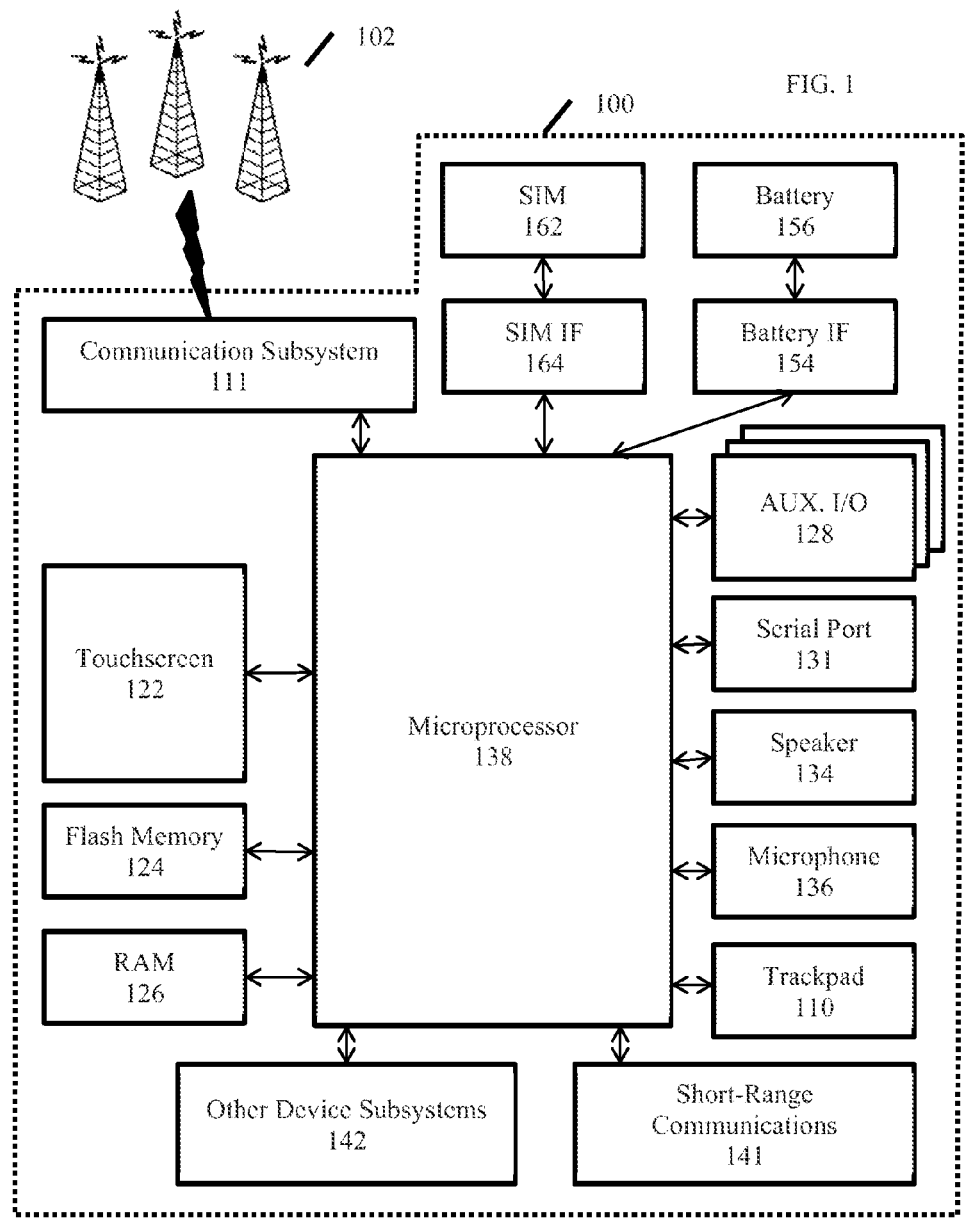
FIG. 1 is a block diagram illustrating a wireless device and a wireless network in accordance with an illustrative embodiment.

In a first broad aspect of the present disclosure, there is provided a system for providing security services to a mobile device, the mobile device being in communication with a public network through a first network path that is subject to interference by a third party, the system comprising a security server and a private network, the security server being operative to communicate with the mobile device through the private network and to communicate with the public network through a second network path that is less susceptible to the interference by the third party than is the first network path, wherein the security server communicates with the public network through the second network path to provide security services to the mobile device that are delivered over the private network.

In an alternative embodiment the third party is capable of interfering with the routing of network traffic transiting the first network path.

In an alternative embodiment the public network is the Internet.

In an alternative embodiment the third party is capable of interfering with the operation of the DNS system of the Internet for devices communicating through the first network path.

In an alternative embodiment the security server communicates with the public network through the second network path to resolve domain names.

In an alternative embodiment the security services are associated with a certificate based trust framework.

In an alternative embodiment the security services comprise real-time validation of certificates.

In an alternative embodiment the security server communicates with the public network through the second network path to validate certificates.

In an alternative embodiment the security services comprise adding trusted certificates to a certificate store of the mobile device.

In an alternative embodiment the security services comprise removing trusted certificates from a certificate store of the mobile device.

In an alternative embodiment, the system further comprises a module in the mobile device for interfacing between the mobile device and the security server.

In an alternative embodiment the security services comprise managing applications installed on the mobile device.

In an alternative embodiment the mobile device primarily communicates with the public network through the first network path.

In a second broad aspect of the present disclosure, there is provided a method of initiating secure communication between a device and a first server that is located in a public network, the method comprising: receiving a certificate at the device from the first server through a first network path connecting to the public network, the first network path being subject to interference by a third party; from the device, querying through a private network a second server to validate the certificate, wherein the second server validates the certificate by communicating through a second network path with a third server that is located in the public network, the second network path being less susceptible to the interference by the third party than is the first network path; receiving a response at the device from the second server through the private network, the response being indicative of a validity of the certificate; and based on the response, determining whether to engage the device in secure communications with the first server through the first network path.

In an alternative embodiment the third-party is capable of interfering with the routing of network traffic transiting the first network path.

In an alternative embodiment the public network is the Internet.

In an alternative embodiment the third-party is capable of interfering with the operation of the DNS system of the Internet for devices communicating through the first network path.

In an alternative embodiment, the method further comprises performing local validation at the device of the certificate using a local certificate store; and wherein determining whether to engage the device in secure communications with the first server is further based on the local validation.

In an alternative embodiment, the method further comprises from the device, querying through the private network the second server for permission to trust an issuer certificate corresponding to the certificate.

In an alternative embodiment the second server uses at least one of the OCSP, CRL, and DPV protocols to validate the certificate.

In an alternative embodiment the device primarily communicates with the public network through the first network path.

Additional aspects and advantages of the present disclosure will be apparent in view of the description which follows. It should be understood, however, that the detailed description, while indicating specific embodiments, are given by way of illustration only, since various changes and modifications within the spirit and scope of the disclosure will become apparent to those skilled in the art from this detailed description.

In the following description, details are set forth to provide an understanding of illustrative embodiments of the disclosure. In some instances, certain steps, signals, protocols, software, hardware, networking infrastructure, circuits, structures and techniques have not been described or shown in detail in order not to obscure the disclosure. Those of skill in the art will understand that the following description of illustrative embodiments of the disclosure does not limit the implementation of embodiments of the disclosure to any particular computer programming language. Embodiments of the disclosure may be implemented in any computer programming language provided that the operating system (O/S) provides the facilities that may support the present disclosure. For instance, an embodiment of the present disclosure may be implemented in part in the JAVA™ computer programming language (or other computer programming languages such as C or C++). Those skilled in the art will also appreciate that any limitations presented by such an embodiment would be a result of a particular type of operating system or computer programming language and would not be a limitation of the present disclosure. Alternative embodiments of the present disclosure may also be implemented in hardware or in a combination of hardware and software.

FIG. 1 is a block diagram illustrating a wireless device 100 and a wireless network 102 that is operative to communicate with the wireless device 100. The wireless network 102 may include antenna, base stations, access points, transceivers, supporting radio equipment, and the like, as known to those of ordinary skill in the art, for supporting wireless communications between the wireless device 100 and other devices (not shown).

The wireless device 100 may be a two-way communication device having voice and/or data communication capabilities, including the capability to communicate with other devices. Depending on the functionality provided by the wireless device 100, it may be referred to as a data messaging device, a two-way pager, a cellular telephone with data messaging capabilities, a wireless Internet appliance, a data communication device (with or without telephony capabilities), a Wi-Fi device, a WLAN device, a dual-mode (i.e., Wi-Fi and cellular) device, a portable audio or video device, a tablet computer, or a smart phone. More generally, aspects of the present disclosure may be applied to other electronic devices such as laptop and desktop computers and handheld computers, whether or not wired or wireless.

The wireless device 100 has a communication subsystem 111, which includes a RF receiver, a RF transmitter, and associated components. As will be apparent to those skilled in the relevant art, the particular design of the communication subsystem 111 depends on the wireless network 102 in which the wireless device 100 is intended to operate.

The wireless device 100 may be capable of cellular network access and hence the wireless device 100 may have a subscriber identity module (or SIM card) 162 for inserting into a SIM interface (IF) 164 in order to operate on the cellular network (e.g. a global system for mobile communication (GSM) network).

The wireless device 100 may be a battery-powered device and so it may also include a battery IF 154 for receiving one or more rechargeable batteries 156. The battery (or batteries) 156 provides electrical power to most if not all electrical circuitry in the wireless device 100, and the battery IF 154 provides for a mechanical and electrical connection for it.

The wireless device 100 includes a microprocessor 138 which controls overall operation of the wireless device 100. The microprocessor 138 interacts with device subsystems such as a flash memory 124 or other persistent store, a random access memory (RAM) 126, auxiliary input/output (I/O) subsystems 128, a serial port (e.g., a universal serial bus (USB) port) 131, the trackpad 110, a speaker 134, a microphone 136, a short-range communications subsystem 141, and other device subsystems 142. The microprocessor 138, in addition to performing operating system functions, preferably enables execution of software applications on the wireless device 100.

The wireless device 100 may also have a touchscreen 122 comprising a touch sensor positioned overtop a display screen, or integrated therewith. The touchscreen 122 may further comprise a transparent cover positioned over the touch sensor and display screen, or integrated therewith. The wireless device 100 may comprise further circuitry, controllers, and/or processors associated with touchscreen 122 to determine, in the event a user touches the touchscreen 122, where on the touchscreen 122 such touch was made, and to report said position to, for example, an operating system executing on microprocessor 138. Wireless device 100 may be configured to accept such input as part of a graphical user input (GUI). More generally, touchscreen 122 may be adapted to receive input from a finger (or, for example, a stylus) whether or not there is physical contact with touchscreen 122.

Figure 2:
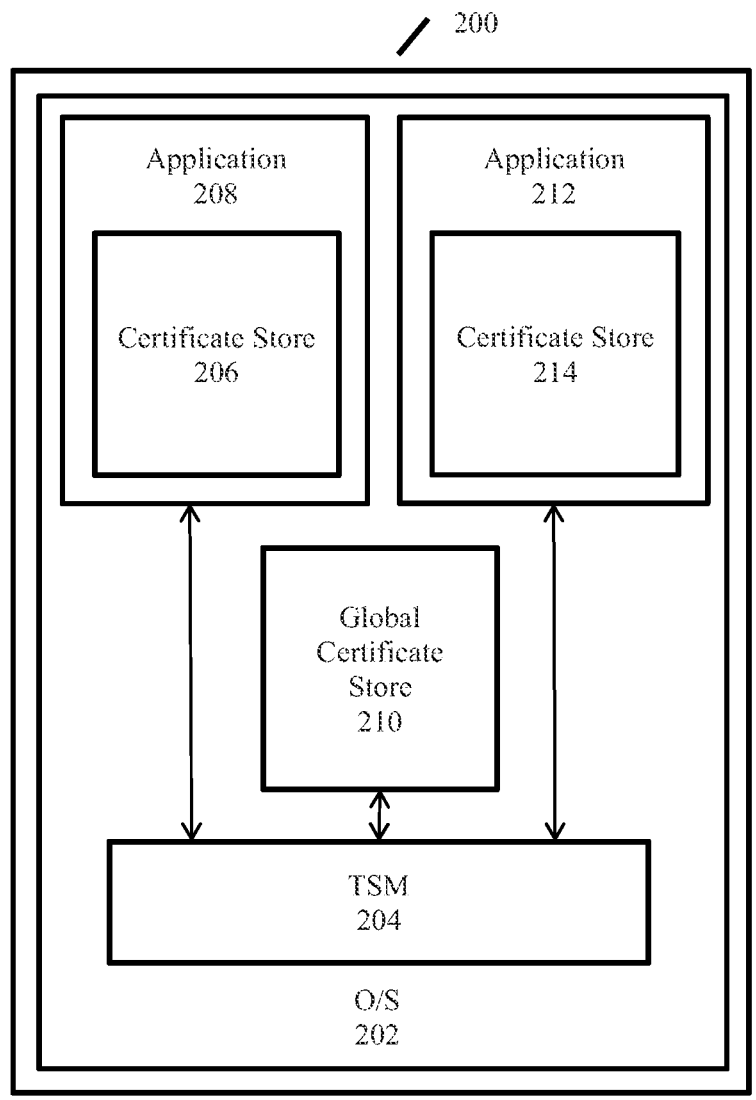
FIG. 2 is a block diagram illustrating a memory of the wireless device of FIG. 1 in accordance with an illustrative embodiment.

FIG. 2 is a logical block diagram illustrating a memory 200 of the wireless device 100 of FIG. 1. The microprocessor 138 is coupled to the memory 200. The memory 200 has various hardware and software components for storing information (e.g., instructions, applications, software, data, database tables, test parameters, etc.) for enabling operation of the wireless device 100 and may include flash memory 124, RAM 126, ROM (not shown), disk drives (not shown), and the like. In general, the memory 200 may include a variety of storage devices typically arranged in a hierarchy of storage as understood to those skilled in the art.

The wireless device 100 may include computer executable programmed instructions for directing the wireless device 100 to operate in a pre-determined manner. The programmed instructions may be embodied in one or more software (or hardware) modules 202, 204, 208, 212 which may be resident in the memory 200 of the wireless device 100. Alternatively, the programmed instructions may be embodied on a computer readable medium (such as a CD disk or floppy disk) which may be used for transporting the programmed instructions to the memory of the wireless device 100. Alternatively, the programmed instructions may be embedded in a computer-readable signal or signal-bearing medium that may be uploaded to a network 102 by a vendor or supplier of the programmed instructions, and this signal or signal-bearing medium may be downloaded through an interface 111, 131, 141 to the memory of the wireless device 100 from the network 102 by end users or potential buyers.

O/S software module 202 used by the microprocessor 138 may be stored in a persistent store such as the flash memory 124, which may alternatively be a read-only memory (ROM) or similar storage element (not shown). Those skilled in the relevant art will appreciate that the operating system, specific device applications, or parts thereof, may be temporarily loaded into a volatile store such as RAM 126 in the course of normal operation of wireless device 100.

To provide a user-friendly environment to control the operation of the wireless device 100, O/S software module 202 resident on the wireless device 100, if executed by the wireless device 100, provides a basic set of operations for supporting various applications typically operable through a GUI. For example, the O/S software module 202 may enable basic input/output system features to obtain input from the auxiliary I/O subsystems 128, trackpad 110, and the like, for facilitating output to the user through touchscreen 122, speaker 134, and the like, and for providing network and Internet connectivity via communication subsystem 111.

A user may interact with the wireless device 100 and software modules 202, 204, 208, 212 using a GUI presented to a user through execution of O/S software module 202 by wireless device 100. In general, a GUI is used to convey and receive information to and from users and can include a variety of GUI objects or controls, including text, labels, windows, icons, toolbars, drop-down menus, dialog boxes, fields, buttons, and the like, all well-known to those skilled in the relevant art. GUIs are supported by common operating systems and, more particularly, may enable a user to input data, choose commands, execute application programs, manage computer files, and perform other functions through use of an input or pointing device such as a trackpad 110 or touching the touchscreen 122. A GUI may include a cursor, and various selectable objects and icons. For example, a user may interact with a GUI presented on the touchscreen 122 by touching (or, more generally, contacting or nearly contacting) an object (e.g., an icon) on the touchscreen 122 with his or her finger (or stylus), causing a "click" to register.

Memory 200 may further comprise a global certificate store 210 for storing digital certificates used as part of a PKI. In particular, as described herein, root, intermediate, and end certificates that are trusted by the user of wireless device 100 may be stored in global certificate store 210 for use in, for example, validating a new end certificate received by wireless device 100. Global certificate store 210 may be accessible only by O/S software module 202, or, in other illustrative embodiments, it may also be accessible by other software modules executing on wireless device 100. For greater certainty, a skilled person in the relevant art will appreciate that storing a certificate in global certificate store 210 is a logical relationship between components in memory 200, and may not correspond to a particular physical relationship within wireless device 100.

Memory 200 may further comprise application software modules 208, 212. Application software module 208 may be a web browser, such as the BlackBerry Browser™ web browser. Application software module 212 may be another network enabled application, such as the BBM™ instant messaging program. A user of wireless device 100 may cause application software modules 208, 212 to execute through a GUI presented on wireless device 100, such as by tapping on a representative icon.

Application software modules 208, 212 may each also maintain certificate stores 206, 214, respectively, for a similar purpose to global certificate store 210. These application specific certificate stores may be primarily used by their respective application software modules, and access by external software modules (e.g. O/S software module 202 or, in respect of certificate store 206, application software module 212) may or may not be permitted. A skilled person in the relevant art will appreciate that while two application software modules are illustratively depicted, wireless device 100 may be configured to have more or less of such modules.

In the illustrative embodiment, one or more applications may maintain their own certificate stores (e.g. certificate stores 206, 214), in addition to a global certificate store (e.g. global certificate store 210). In other illustrative embodiments, no application specific certificate stores may be used. In still other illustrative embodiments, multiple global certificate stores may be used. A skilled person in the art will appreciate that various certificates stores, variously configured, may be used to provide desired functionality in wireless device 100.

A skilled person in the art will further appreciate that certificate stores may be updated. Users of wireless device 100 may update, for example, global certificate store 210 through update functionality provided through O/S software module 202 (e.g. certificate import functionality). Alternatively, the developer of O/S software module 202 may provide manual or automatic software updates that include, among other things, updates to the global certificate store 210. The same options may be available to update application specific certificate stores 206, 214. For example, where application software module 208 is a web browser, updates to certificate store 206 may be provided through software updates to application software module 208, although certificate update functionality may also be separately provided through an interface provided by application software module 208.

In the illustrative embodiment, memory 200 further comprises trust and security management (TSM) module 204. TSM module 204 may be incorporated into O/S software module 202 or may be a separate module installed therein. TSM module 204 may be capable of interfacing with global certificate store 210 and application software modules 208, 212, including certificates stores 206, 214 therein. A skilled person in the relevant art will appreciate that such interface is a logical connection representative of communication links between software modules during execution and may not correspond to a physical connection within wireless device 100. For example, in an illustrative embodiment of the present embodiment, TSM module 204 may comprise software capable of accessing an application programming interface (API) provided by application software module 208. TSM module 204 may further operate to provide wireless device 100 with the capability of interfacing with a certificate based trust framework using a secondary network, as illustratively described herein.

Figure 3:
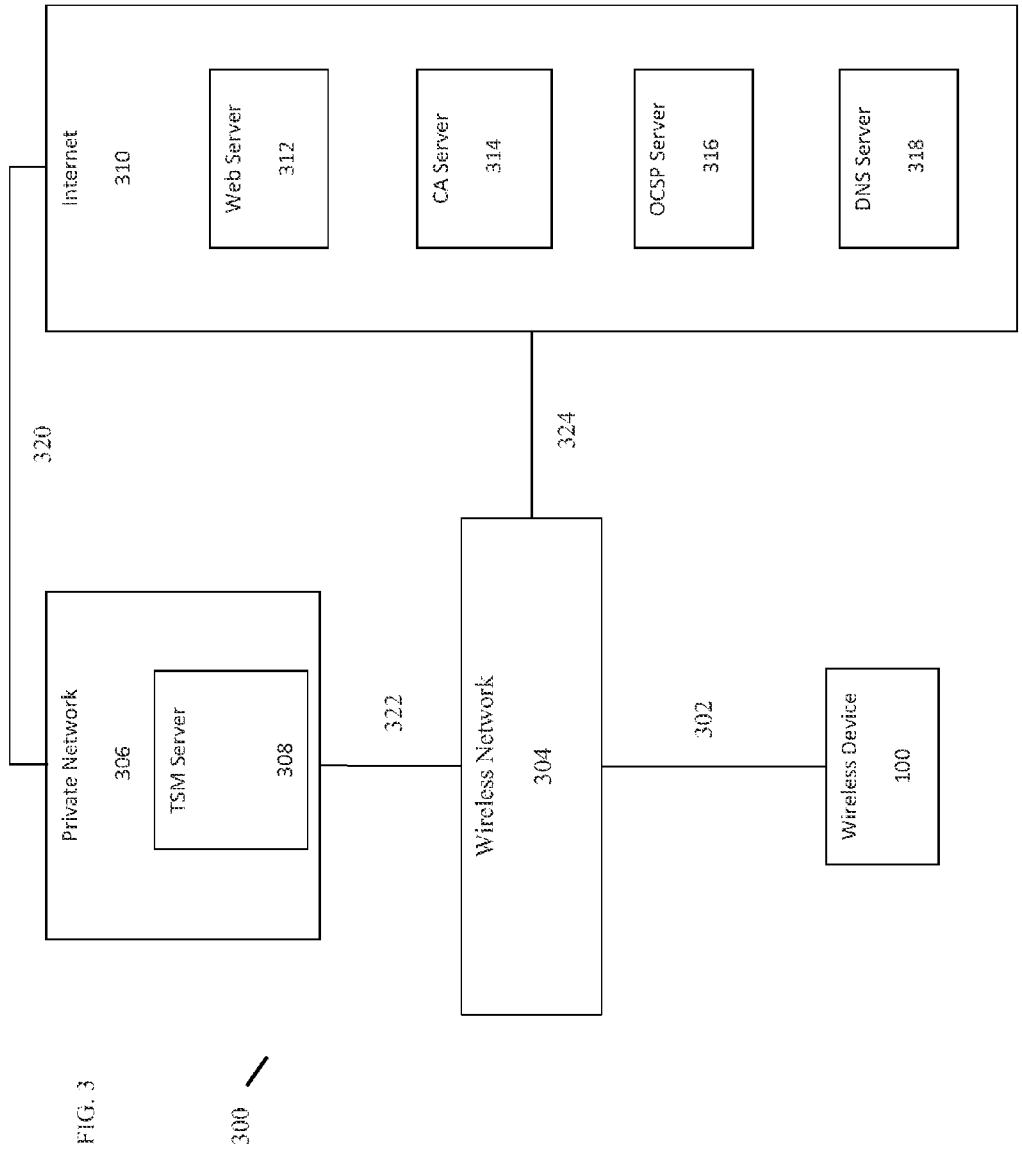
FIG. 3 is a block diagram of a system for providing a trust framework in accordance with an illustrative embodiment.

FIG. 3 is a block diagram of a system for providing a trust framework using a secondary network in accordance with an illustrative embodiment. System 300 comprises wireless device 100 connected via wireless connection 302 to wireless network 304. A skilled person in the relevant art will readily appreciate that this may be a standard wireless connection between, for example, wireless device 100 comprising a smartphone, and wireless network 304 comprising a cellular network configured and operating in accordance with the GSM™ standard and providing voice and data services to wireless device 100.

System 300 may further comprise wireless network 304 connected to the Internet 310 via connection 324. Again, a skilled person in the relevant art will readily appreciate that wireless network 304 may comprise, for example, a general packet radio service (GPRS) network that provides, among other things, wireless device 100 with connectivity to Internet 310 through one or more GPRS support nodes and related network infrastructure. Internet 310 may further comprise other components, including the exemplary web server 312, certificate authority (CA) server 314, OCSP server 316, and DNS server 318. More generally, a skilled person in the relevant art will appreciate that while the term the "Internet" generally refers to a particular globally accessible network of interconnected computers, embodiments of the present disclosure may similarly be applied to other computer networks, both public and private, and that the term the "Internet" should be understood to refer to such networks generally.

In illustrative embodiments, system 300 may further comprise a private network 306 connected to wireless network 304 by means of connection 322, and further connected to the Internet by means of connection 320. In this illustrative embodiment, private network 306 comprises a secondary network in view of primary connection 324 between wireless network 304 and the Internet 310. Private network 306 may be connected to other wireless networks (not shown) that themselves may be connected to other wireless devices (not shown). Private network 306 may also comprise TSM server 308, operating as described herein. A skilled person in the relevant art will further appreciate that TSM server 308 may also be configured to reside elsewhere, such as in wireless network 304.

In one embodiment, private network 306 may be the BlackBerry Relay™ private network that is owned and operated by Research in Motion and used to support and enable a variety of telecommunication services for wireless devices. In this illustrative embodiment, the BlackBerry Relay™ private network is operatively connected to wireless networks operated by wireless telecom providers worldwide, each such wireless network itself having wireless devices operatively connected thereto.

More generally, a skilled person in the relevant art will appreciate that private network 306 may be substantially similar in construction to public networks, such as the Internet 310, but may be configured to limit public or third-party access thereto. For example, the BlackBerry Relay™ private network may be configured and strictly controlled to permit only access and use by certain parties, such as specific telecom providers and, indirectly, their customers. In other illustrative embodiments, private network 306 may permit public access.

A skilled person in the relevant art will also appreciate that computer servers, such as TSM server 308, web server 312, CA server 314, OCSP server 316, and DNS server 318, while depicted in FIG. 3 as single discrete logical components, may each comprise (and share) one or more physical computing devices and related infrastructure. For example, DNS server 318 may comprise a plurality of individual computer servers, as well as related components such as load balancers and backups for providing redundancy. In other illustrative embodiments, CA server 314 and OCSP server 316 may reside on the same physical machine. Similarly, a skilled person in the relevant art will appreciate that the depicted components of Internet 310 comprise only a small fraction of the whole of the Internet and that various components are omitted for the purpose of not obscuring the present disclosure.

A skilled person in the relevant art will further appreciate that a network, such as wireless network 304 and private network 306, may comprise one or more computing devices along with related infrastructure such as switches, routers, and gateways, such components potentially in internal and external communication through both wired and wireless links. For example, private network 306 may comprise (a) servers located in physical proximity to components of wireless network 304 (e.g. collocated in the same data center) and connected therewith over high-bandwidth local area connections, (b) separately located servers for providing services over private network 306, as well as (c) leased lines that connect such servers in a private and secure manner.

FIG. 4A is a signal diagram depicting a prior art method for installing and updating certificates and applications as part of a certificate based authentication framework, particularly in the context of wireless device 100, web server 312, and the illustrative system depicted in FIG. 3. This prior art method is representative of existing frameworks, such as Transport Level Security (TLS).

At step 402, a self-issued root certificate issued by CA server 314 is provided to wireless device 100, and installed thereon. This process may be mediated by, for example, software or hardware manufacturers that may include this root certificate as a trusted root certificate in software to be installed on wireless device 100. In other illustrative embodiments, a user of wireless device 100 may manually install root certificates on wireless device 100 through suitable certificate installation functionality. Typically, installation of a root certificate comprises adding a root certificate to a certificate store of wireless device 100 (e.g. global certificate store 210).

At step 404, a certificate is issued by CA server 314 and installed on a particular web server 312. This is typically not an automated process, but rather, such step is mediated by the individuals in control of web server 312.

At step 406, root certificates and applications are updated on wireless device 100. Such updating may comprise manual importing or removal of trusted root certificates, or manual or automatic software updates. For example, web browser applications (e.g. application software module 208 installed on wireless device 100 may be configured to periodically query a third-party server to determine if an update to application software module 208 is available, and if so, may download and install such update (which may include updates to the trusted root certificates). In other illustrative embodiments, a user may manually add or remove root certificates from the certificate store (e.g. certificate store 214) of a specific application (e.g. application software module 212).

FIG. 4B is a signal diagram depicting a prior art method for negotiating transport level security as part of a certificate based authentication framework, particularly in the context of wireless device 100, web server 312, and the illustrative system depicted in FIG. 3. This prior art method is representative of existing frameworks, such as TLS.

At step 408, wireless device 100 communicates with web server 312 and initiates a handshaking protocol therewith. For example, application software module 208 may be a web browser executing on wireless device 100 and attempting to access an online banking website using TLS.

At step 410, web server 312 returns to wireless device 100 its digital certificate in accordance with the handshaking protocol. For example, web server 312 may return a X.509-compliant digital certificate to wireless device 100 (and more specifically, application software module 208 executing on wireless device 100). Once wireless device 100 receives the certificate, it may commence validating the certificate to determine whether it should trust such certificate and, by implication, web server 312, in accordance with prior art methods. For example, wireless device 100 may (a) review the certificate of the issuer of the server certificate, and (b) determine whether it trusts the issuer of the certificate based on the trusted CAs in a certificate store of wireless device 100 (e.g. certificate store 206).

Assuming wireless device 100 trusts the certificate based on its certificate chain, and further, is configured to perform OCSP validation, at step 412, wireless device 100 may query a DNS server (such as DNS server 318) to determine the IP address of the OCSP server for the certificate received from web server 312, based on a URL provided within the certificate. A skilled person in the relevant art will appreciate that this process may be known as resolving a domain name.

At step 414, DNS server 318 may return a result comprising, among other things, the IP address corresponding to a particular domain name (i.e. of the appropriate OCSP server such as OCSP Server 316). This response may comprise a standard DNS response.

At step 416, wireless device 100 may, using the received IP address of OCSP Server 316, query such server in accordance with the OCSP in order to determine whether the previously received certificate remains valid (e.g. has not been revoked).

At step 418, OCSP Server 316 may return a result to wireless device 100 indicating the status of the certificate (e.g. "good", "revoked", or "unknown").

Assuming the certificate has not been revoked, wireless device 100 has thus validated the certificate and, at step 420, wireless device 100 and web server 312 complete the handshaking protocol, and are able to commence secure communications (at step 422).

In alternative prior art methods, instead of seeking to contact and query an OCSP server at steps 412 to 418, wireless device 100 may illustratively seek to access a CRL published by the issuer of the digital certificate received from web server 312. For example, based on an URL included in the received certificate, wireless device 100 may retrieve a CRL from CA server 314, and if the received certificate is not on the retrieved CRL, proceed to trust web server 312 as described herein.

The methods illustratively described in relation to FIGS. 4A and 4B also help highlight various vectors of attack that may be employed by a malicious third-party (such as a nation state) in order to undermine the aforedescribed trust framework and corresponding security protocols. For example, at step 406, an application software module 208 may be designed to contact a specific server at a specific URL or IP address in order to obtain software updates that include, for example, updates to trusted root certificates. In the event a third-party can disrupt the ability for wireless device 100 to contact such server, and in turn, learn of and obtain appropriate software updates, wireless device 100 may be at greater risk due to its inability to have its trusted root certificates automatically updated. In other illustrative embodiments, such disruption may prevent wireless device 100 from being notified that it is executing out-of-date software that may, for example, have unpatched security vulnerabilities. A skilled person in the relevant art will appreciate that there are numerous means by which a third-party may disrupt the ability of wireless device 100 to contact such server, such as affecting the network routing between wireless device 100 and such server.

Similarly, at step 412, resolving the domain name of OCSP server 316 may be disrupted by, for example, a malicious third-party intercepting such query by wireless device 100 and returning an incorrect IP address; and at step 416, querying OCSP server 316 for the status of a certificate may be disrupted by affecting the ability of wireless device 100 to contact OCSP server 316. In illustrative prior art embodiments, while failures in contacting DNS server 318 or OCSP server 316 may be anticipated, such implementations may, for example, resolve such failures by asking the user of wireless device 100 to decide whether to ignore such failure and nevertheless trust web server 312, notwithstanding the inability to fully validate the received certificate. In practice, not all users may be proficient in assessing the cause of such failure and determining whether or not to ignore the failure in the certificate validation process.

FIG. 5A is a signal diagram depicting a method for installing and updating certificates and applications in accordance with an illustrative embodiment of the present disclosure, and particularly in the context of wireless device 100, web server 312, TSM server 308, and the illustrative system depicted in FIG. 3.

At step 502, wireless device 100 (illustratively comprising, among other things, TSM module 204) and TSM server 308 communicate so as to install one or more root certificates corresponding to one or more CAs on wireless device 100 as trusted CAs. In some embodiments, TSM server 308 (and wireless device 100) may be configured to autonomously determine what root certificates to install on wireless device 100 without requiring confirmation from a user of wireless device 100.

Illustratively, the operation of wireless device 100 may be controlled in the above respect (and in respect of the methods described herein) by TSM module 204. For example, O/S software module 202 and TSM module 204 may be mutually designed and configured so that TSM module 204 is capable of communicating with TSM server 308 and effecting certain instructions and other directions issued by TSM server 308.

At step 504, a certificate is issued by CA server 314 and installed on a particular web server 312. This is typically not an automated process, but rather, such step is mediated by the individuals in control of web server 312.

At step 506, wireless device 100 and TSM server 308 periodically communicate so as to update the root certificates and applications on wireless device 100. As described herein, in the prior art such updating may comprise manual importing or removal of trusted root certificates, or manual or automatic software updates. In the illustrative embodiment, TSM server 308, TSM module 204, and wireless device 100 more generally, may be mutually designed and configured to permit TSM server 308 to remotely manage the root certificates and applications installed on wireless device 100. For example, TSM server 308 may install root certificates determined by the operator of TSM server 308 (e.g. the manufacturer of wireless device 100) to be appropriate for wireless device 100 to trust, effect the update of out-of-date applications installed on wireless device 100, remove root certificates determined by a business' network administrator (that is responsible for wireless device 100) to be no longer trustworthy or otherwise compromised, or prevent the continued use of out-of-date applications installed on wireless device 100.

FIG. 5B is a signal diagram depicting a method for negotiating transport level security in accordance with an illustrative embodiment of the present disclosure, and particularly in the context of wireless device 100, web server 312, TSM server 308, and the illustrative system depicted in FIG. 3.

At step 508, wireless device 100 attempts to access web server 312 and initiates a handshaking protocol therewith. For example, application software module 208 may be a web browser attempting to access an online banking website using TLS.

At step 510, web server 312 returns to wireless device 100 its digital certificate in accordance with the handshaking protocol. For example, web server 312 may return a X.509 compliant digital certificate to wireless device 100 (and more specifically, application software module 208 executing on wireless device 100). Once wireless device 100 receives the certificate, it may commence validating the certificate to determine whether it should trust such certificate and, by implication, web server 312, in accordance with prior art methods. For example, wireless device 100 may (a) review the certificate of the issuer of the server certificate, and (b) determine whether it trusts the issuer of the certificate based on the trusted CAs in a certificate store of wireless device 100 (e.g. certificate store 206).

Assuming wireless device 100 trusts the certificate based on its certificate chain, at step 512, wireless device 100 contacts TSM server 308 to request further validation of the certificate. For example, application software module 208 (illustratively in conjunction with TSM module 204) may be configured to cause wireless device 100 to transmit a copy of the certificate to TSM server 308, along with related information, in accordance with a predetermined protocol.

At steps 514, 516, 518, 520, TSM server 308 may, in an illustrative embodiment, employ prior art methods, including, for example, prior art OCSP validation, to further validate the certificate (e.g. assess the current status of the certificate). For example, as previously described in relation to wireless device 100 in respect of FIG. 4B, at step 514 TSM server 308 may similarly query a DNS server 318 to resolve the IP address of OCSP server 316 based on a URL provided in the certificate; at step 516 TSM server 308 may similarly receive such IP address from DNS server 318; at step 518 TSM server 308 may query OCSP server 316 at the received IP address with regard to the status of the certificate in question (e.g. has not been revoked); and at step 520 TSM server 308 may receive a response from OCSP server 316 comprising an indication of the status of the certificate (e.g. "good", "revoked", or "unknown").

Upon receiving the status of the server certificate from OCSP server 316, TSM server 308 may, at step 522, further transmit the status of the certificate to wireless device 100, in response to the query identified as step 512. Again, such communication between wireless device 100 and TSM server 308 may be by means of a predetermined protocol not necessarily related to the known OCSP protocol.

Assuming TSM server 308 advises wireless device 100 that the certificate is valid, wireless device 100 may be configured to trust the determination of TSM server 308 and therefore consider the certificate validated (illustratively, in conjunction with previous certificate analysis done by itself). Accordingly, at step 524, web server 312 and wireless device 100 complete the handshaking protocol, and are able to commence secure communications (at step 526).

In the illustrative embodiment described above, TSM server 308 is configured to use only a single method (i.e. OCSP validation) to assess the validity of a particular digital certificate. In other embodiments, TSM server 308 may be configured to use alternative methods, including, for example, other prior art methods such as CRLs and DPV. Security server 308 may further be configured to use other proprietary methods, such as, for example, private certificate revocation lists maintained by the operator of TSM server 308. A skilled person in the relevant art will appreciate that TSM server 308 may employ one or more methods to validate a particular digital certificate, in conjunction or separately.

In further illustrative embodiments, TSM server 308 may be configured to use caching to store locally the status of a certificate certificates for a given period of time. For example, TSM server 308 may temporarily cache the status of certificates corresponding to popular websites (e.g. search engines and popular web applications) and respond to a query from wireless device 100 (e.g. step 512) on the basis of the cached status, instead of repeating steps 514, 516, 518, 520 in response to each query.

In further illustrative embodiments, wireless device 100 may also be configured to validate the status of the application seeking to access web server 312. For example, where application software module 208 is a web browser attempting to access an online banking website using TLS, TSM module 204 may, as part of the aforedescribed method, also confirm that application software module 208 is not a version of such web browser that has been revoked due to security concerns. Such confirmation may be conducted by comparing the version of such web browser with a list of revoked versions maintained on wireless device 100 (and updated periodically by TSM server 308); alternatively, such confirmation may be conducted by wireless device 100 querying TSM server 308 in a manner analogous to wireless device 100 querying TSM server 308 to validate the received server certificate. Wireless device 100 (and TSM module 204) may thus, for example, be configured to permit communication between application software module 208 and web server 312 only if application software module 208 is up-to-date.

In further illustrative embodiments, TSM server 308, as a component of private network 306, may be configured so that its primary connection (e.g. connection 320) to the Internet 310 (and servers therein such as DNS server 318 and OCSP server 316) is different, as described herein, from the primary connection (e.g. connection 324) between wireless network 304 and the Internet 310 (and servers therein such as DNS server 318 and OCSP server 316), such connection between wireless network 304 and the Internet 310 also the primary network path for wireless device 100 to connect to the Internet 310.

In an illustrative embodiment, wireless network 304 may be physically located in a given jurisdiction, and connected to the Internet 310 through connection 324 subject to the control of the given jurisdiction. For example, connection 324 may comprise traversing a firewall under governmental control and designed to filter or otherwise affect certain traffic. Illustratively, such firewall may be designed to selectively limit access to OCSP Server 316, or to modify responses from DNS Server 318. More generally, connection 324 may be subject to third-party interference or control, or may transit a particular jurisdiction.

In the illustrative embodiment, connection 320 differs from connection 324 in respect of at least some of the aforementioned characteristics, such as being subject to the control of the jurisdiction (or jurisdictions) that connection 320 is subject to control by (although, connection 324 may, for example, be subject to the control of one or more other jurisdictions). For example, connection 320 may not comprise traversing the aforementioned firewall under governmental control. In other circumstances, connection 320 may be configured to avoid selective filtering or censorship that connection 324 is subject to, such as access to OCSP Server 316 or receiving correct response from DNS Server 318. More generally, connection 320 may not be subject to the same third-party interference or control that connection 324 is subject to, or may be configured to not transit a particular jurisdiction that connection 324 may transit.

Another illustrative embodiment is wherein private network 306 is the BlackBerry Relay™ private network that is operatively connected to numerous wireless telecom providers worldwide, each wireless telecom provider operating a wireless network (e.g. wireless network 304) that is connected to the BlackBerry Relay™ private network via a connection (e.g. connection 322). In such embodiment, each provider's wireless network may be operatively connected to the Internet 310 through different network paths, routers, servers, and firewalls (e.g. connection 324) and subject to different third-party control (e.g. by governmental bodies), for example, by virtue of whether or not such Internet connections transit a given jurisdiction. Similarly, the BlackBerry Relay™ private network (i.e. private network 306) may also be operatively connected to the Internet 310 through one or more connections (collectively, connection 320), such connections operatively connected to the Internet through different (at least in part) network paths, routers, servers, and firewalls, and subject to different third-party control (e.g. by governmental bodies), for example, by virtue of whether or not such connections transit a given jurisdiction.

Illustratively, TSM server 308 in the embodiments described herein relies upon connection 320 when contacting servers (e.g. OCSP server 316) located in the Internet 310; in contrast, wireless device 100 in the prior art embodiments described herein relies upon connection 324 when contacting servers (e.g. DNS server 318) located in the Internet 310. Accordingly, in embodiments of the present disclosure involving TSM server 308, while a malicious third-party may have the capability to undermine prior art trust frameworks and corresponding security protocols by virtue of its control over connection 324, the use of connection 320 (that may have different characteristics in respect of the control that the third-party may exert on such connection) may affect the extent to which the third-party can undermine the trust frameworks and corresponding security protocols disclosed herein, or more specifically, affect the ability for TSM server 308 to validate a received digital certificate.

FIG. 5C is a signal diagram depicting a method for negotiating transport level security in accordance with another illustrative embodiment of the present disclosure, and particularly in the context of wireless device 100, web server 312, TSM server 308, and the illustrative system depicted in FIG. 3.

At step 528, wireless device 100 attempts to access web server 312 and initiates a handshaking protocol therewith. For example, application software module 212 may be a smartphone application attempting to contact an application server using TLS.

At step 530, web server 312 returns to wireless device 100 its digital certificate in accordance with the handshaking protocol. For example, web server 312 may return a X.509 compliant digital certificate to wireless device 100. Once wireless device 100 receives the certificate, it may commence validating the certificate to determine whether it should trust such certificate and, by implication, web server 312, in accordance with prior art methods. For example, wireless device 100 may (a) review the certificate of the issuer of the server certificate, and (b) determine whether it trusts the issuer of the certificate based on the trusted CAs in a certificate store of wireless device 100 (e.g. certificate store 214).

Assuming wireless device 100 determines that it is not currently configured to trust the received server certificate on the basis of its certificate chain (e.g. wireless device 100 is not configured to trust the issuer of the received certificate), at step 532, wireless device 100 contacts TSM server 308 to request to trust the CA that issued the received server certificate (i.e. request that the certificate of such CA be added to an appropriate certificate store of wireless device 100).

TSM server 308 may be configured to receive such request, and to assess whether to authorize such request (i.e. to cause wireless device 100, in conjunction with TSM module 204, to add the certificate of such CA to an appropriate certificate store of wireless device 100). TSM server 308 may, for example, maintain a list of certificate authorities that may be trusted, such list customized for individual wireless devices or for groups of wireless devices (e.g. all wireless devices associated with a given enterprise user).

Assuming TSM server 308 determines that it should authorize such request, TSM server 308 transmits its approval to wireless device 100, and wireless device 100 proceeds to add the relevant CA as a trusted CA (i.e. adds the certificate of such CA into an appropriate certificate store on wireless device 100). In an illustrative embodiment, TSM module 204 on wireless device 100 is in operative communication with TSM server 308, and upon receiving a positive reply from TSM server 308, TSM module 204 may cause the certificate of the relevant CA to be added to application specific certificate store 214 for use by application software module 212.

At step 536, wireless device 100 further contacts TSM server 308 to request further validation of the certificate. For example, application software module 212 (illustratively in conjunction with TSM module 204) may be configured to cause wireless device 100 to transmit a copy of the certificate received from web server 312 to TSM server 308, along with related information, in accordance with a predetermined protocol. A skilled person in the art will appreciate that this step of further validating the server certificate may also be simultaneously requested together with the aforementioned step of wireless device 100 requesting to trust the CA that issued the received server certificate.

At steps 538, 540, 542, 544, TSM server 308 may, in an illustrative embodiment, employ prior art methods, including, for example, prior art OCSP validation, to further validate the certificate (e.g. assess the current status of the certificate). For example, as previously described in respect of FIGS. 4B and 5B, at step 538 TSM server 308 may similarly query a DNS server 318 to resolve the IP address of OCSP server 316 based on a URL provided in the certificate; at step 540 TSM server 308 may similarly receive such IP address from DNS server 318; at step 542 TSM server 308 may query OCSP server 316 at the received IP address with regard to the status of the certificate in question (e.g. has not been revoked); and at step 544 TSM server 308 may receive a response from OCSP server 316 comprising an indication of the status of the certificate (e.g. "good", "revoked", or "unknown").

Upon receiving the status of the server certificate from OCSP server 316, TSM server 308 may, at step 546, further transmit the status of the certificate to wireless device 100, in response to the query identified as step 536. Again, such communication between wireless device 100 and TSM server 308 may be by means of a predetermined protocol not necessarily related to the known OCSP protocol.

Assuming TSM server 308 advises wireless device 100 that the certificate is valid, wireless device 100 may be configured to trust the determination of TSM server 308 and therefore consider the certificate validated (illustratively, in conjunction with previous certificate analysis done by itself). Accordingly, at step 548, web server 312 and wireless device 100 complete the handshaking protocol, and are able to commence secure communications (at step 550).

Additionally, the above alternative embodiments described with reference to FIG. 5B similarly apply to this further embodiment described with reference to FIG. 5C. For example, TSM server 308 may be similarly configured to use CRLs, DPV, or OCSP to validate the certificate chain; caching may be employed by TSM server 308; applications may also be validated by wireless device 100; and TSM server 308 may be configured so that its connection (i.e. connection 320) to the Internet 310 is different from the primary connection between wireless network 304 and the Internet 310 (i.e. connection 324), as described herein.

Still further, in respect of the methods depicted by FIGS. 5B and 5C, a skilled person in the art will appreciate that such methods may also address circumstances wherein the received service certificate is not validated, or where the overall security protocol does not successfully complete. Such circumstances may include, for example, situations wherein (a) wireless device 100 explicitly does not trust the issuer of the received certificate; (b) a certificate is marked as revoked by its inclusion on a CRL; (c) a OCSP responder indicates that a certificate has been revoked; (d) the application executing on wireless device 100 is obsolete; and (e) certain Internet servers (e.g. DNS server 318) cannot be accessed (e.g. by wireless device 100 or TSM server 308). A skilled person will appreciate that wireless device 100, TSM module 204, and TSM server 308 may be configured to take various actions in such circumstances and embodiments. For example, in some embodiments, the user of wireless device 100 may be advised of the failure and provided the opportunity to continue regardless. In other embodiments, in circumstances of failure, communication (e.g. between wireless device 100 and web server 312) may be prevented altogether.

FIG. 6 is a flow diagram depicting a setup and ongoing update operation in accordance with an illustrative embodiment of the present disclosure, and particularly in the context of wireless device 100, web server 312, TSM server 308, and the illustrative system depicted in FIG. 3. Such operation may be performed by wireless device 100 (and more specifically TSM module 204 executing on wireless device 100) and illustratively corresponds, in part, to step 506, described above, of updating, on an ongoing basis, the root certificates and applications on wireless device 100.

At step 602, wireless device 100 receives instructions to use a TSM framework comprising methods and systems illustratively described herein. For example, if wireless device 100 is an unmanaged consumer device, wireless device 100 may be configured to present a user with a notification window when first accessing the device. This notification window may include an opt-in option, and if selected by the user, constitutes wireless device 100 receiving instructions to enable and use the TSM framework. In other illustrative embodiments, wireless device 100 may be configured to present in a configuration or setup menu an equivalent option to a user. If wireless device 100 is a managed enterprise device, wireless device 100 may instead receive instructions to enable and use the TSM framework from an enterprise network administrator, instead of the direct user of wireless device 100.

At step 604, on the basis of the instructions received at step 602, TSM module 204 is enabled on wireless device 100 and registers wireless device 100 with TSM server 308 so as to avail itself of the TSM framework. In illustrative embodiments, such registration may entail, among other things, wireless device 100 transmitting to TSM server 308 a device code identifying wireless device 100, the current status of the certificate stores of wireless device 100 (e.g. what certificates are currently trusted), and a list of applications (and their versions) installed on wireless device 100. Although not depicted in FIG. 6, TSM server 308, upon receiving a registration request from wireless device 100, may store details of such registration request, and be further configured to thereafter provide security services to wireless device 100 pursuant to the TSM framework as described herein. For example, such security services may comprise certificate store and application updates, as well as certificate validation services, all as illustratively described herein.

Following initial registration, at step 606 wireless device 100 (and more specifically, TSM module 204 executing therein) may be configured to listen for instructions from TSM server 308, and, if instructions are received from TSM server 308, to parse and interpret such instructions so as to continue with the operation depicted by FIG. 6.

Illustratively, at step 608 wireless device 100 receives instructions from TSM server 308 to update a particular certificate store on wireless device 100 (e.g. one of certificate stores 206, 210, 214). These instructions may comprise removing a previously trusted root certificate, such as if such certificate has been comprised or should otherwise not be trusted. These instructions may also comprise adding a new root certificate.

At step 610, such instructions are carried out by TSM module 204 executing on wireless device 100, namely, the specified certificate store is updated by removing or adding a certificate. As described herein, such actions may be facilitated by the interface between TSM module 204 and other logical components, such as global certificate store 210 and application software modules 208, 212, including certificates stores 206, 214 therein.

Alternatively, at step 612 wireless device 100 receives instructions comprising an updated application status of an application installed on wireless device 100, such as application software module 212. Wireless device 100 may, at corresponding step 614, update a list of application statuses stored on wireless device 100 for the purpose of future validation, such as if application software module 212 seeks to contact web server 312, as described above. In such embodiments, the received application status update may comprise a list of one or more versions of software that are revoked due to security concerns.

In other illustrative embodiments, wireless device 100 may, at corresponding step 614, cause certain applications to be updated. Such update may be initiated by TSM module 204, and may occur silently (i.e. transparent to the user) or upon seeking and/or receiving confirmation from the user of wireless device 100.

Finally, steps 606, 608, 610, 612, 614 are repeated so long wireless device 100, (and more specifically, TSM module 204 executing thereon), remains configured to listen for instructions from TSM server 308 pursuant to the TSM framework described herein. Although not depicted in FIG. 6, illustratively, the user of wireless device 100 may manually disable use of the TSM framework, or the network administrator of wireless device 100 may do so.

In the illustrative embodiment described above, the communication protocol between TSM module 204 and TSM server 308 in furtherance of the operation depicted by FIG. 6 is a push protocol wherein TSM server 308 periodically sends instructions to wireless device 100 (and more specifically, TSM module 204). In other illustrative embodiments, TSM module 204 and TSM server 308 may communicate through a pull protocol wherein TSM module 204 periodically queries TSM server 308 for instructions. More generally, including in respect of the methods described in relation to FIGS. 5A, 5B, 5C, messages from TSM server 308 (and, in some embodiments, wireless device 100) may be digitally signed to ensure the integrity of the requests, responses, messages and instructions made or sent between wireless device 100 and TSM server 308. This may include, for example, causing wireless device 100 to, by default, trust the certificate of TSM server 308.

FIG. 7 is a flow diagram depicting a certificate validation operation in accordance with an illustrative embodiment of the present disclosure, and particularly in the context of wireless device 100, web server 312, TSM server 308, and the illustrative system depicted in FIG. 3. Such operation illustratively corresponds, in part, to the method for negotiating transport level security described in FIG. 5B, and may be performed by one or more software modules on wireless device 100 such as TSM module 204 and application software module 212.

At step 702, wireless device 100 receives a digital certificate. For example, application software module 212 executing on wireless device 100 may receive a certificate from web server 312, and may need to determine whether or not to trust such certificate for the purpose of entering secure communications therewith.

At step 704, such application (e.g. application software module 212) determines whether such certificate is in its corresponding (or global) certificate store as a trusted certificate. If so, it is, at step 718, determined to be a trusted certificate and the certificate is validated. In other illustrative embodiments (not depicted), even if such certificate is in a corresponding certificate store, the operation may proceed to step 708, as described herein, to further validate the certificate.

If such application (e.g. application software module 212) determines that such certificate is not in its corresponding (or global) certificate store as a trusted certificate, at step 706, the certificate chain of the certificate is validated (e.g. by using a local certificate store such as one of certificate stores 206, 210, 214) to determine whether wireless device 100 should trust such certificate (and, by implication, web server 312). For example, wireless device 100 may, to determine whether it trusts the issuer of the certificate, (a) look up the certificate of the issuer of the received certificate, and (b) validate the certificate of the issuer against the trusted CAs in a local certificate store.

If the issuer of the end certificate is not a trusted CA, wireless device 100 may proceed, at step 712, to query TSM server 308 for approval to add the certificate of the issuer to an appropriate certificate store (i.e. to trust the issuer). If wireless device 100 receives, at step 714, the approval of TSM server 308, wireless device 100 proceeds accordingly (i.e. adds the certificate to one of its certificate stores).

Regardless of whether step 712 and step 714 are performed, wireless device 100 may further perform step 708 by contacting TSM server 308 to request further validation of the received end certificate. For example, TSM module 204 executing on wireless device 100 in combination with application software module 212 may be configured to transmit a copy of the end certificate to TSM server 308, along with related information, in accordance with a predetermined protocol. If wireless device receives, at step 710, the approval of TSM server 308 (i.e. an indication that the end certificate has not been revoked), wireless device 100, at step 718, determines the end certificate to be a trusted certificate and the certificate is validated.

In contrast, if TSM server 308 does not approve the requests of step 708 or step 712, wireless device 100, at step 716, determines that the end certificate is not a trusted certificate, the validation process has failed, and wireless device 100 may proceed to, for example, request further user confirmation or prevent further communication with the remote server (e.g. web server 312).

All publications and patent applications mentioned in this specification are herein incorporated by reference to the same extent as if each individual publication or patent application was specifically and individually incorporated by reference.

While the foregoing disclosure has been described in some detail for purposes of clarity and understanding, it will be appreciated by one skilled in the art, from a reading of the disclosure, that various changes in form and detail can be made without departing from the true scope of the disclosure.

What is claimed is:

1. A method of initiating secure communication between a mobile device and a web server of a public network, said method comprising:
   receiving a certificate at said mobile device from said web server through a primary network path connecting said mobile device to said public network, said primary network path including a firewall configured to interfere with operation of a domain name system (DNS) server of the public network when the DNS server is validating the certificate, wherein the firewall is configured to interfere with operation of the DNS server by at least one of:
   modifying the certificate received from the mobile device to change an internet protocol (IP) address of an online certificate status protocol (OSCP) server of the public network;
   limiting access to the OCSP server when receiving a request for OCSP validation of the certificate from the DNS server;
   limiting access to the DNS server when querying for the IP address of the OSCP server;
   modifying a response from the DNS server when querying the DNS server for the IP address of the OSCP server; or
   returning an incorrect IP address for the OSCP server to the mobile device when querying the DNS server for the IP address of the OSCP server;
   sending, from said mobile device, a request to a trust and security management server to validate said certificate, wherein said trust and security management server validates said certificate by communicating the DNS server of said public network through a separate secondary network path that is different than the primary network path;
   receiving, at said mobile device, a response to said request from said trust and security management server, said response indicating whether said certificate is valid; and
   establishing, at said mobile device, secure communications between said mobile device and said web server, through said primary network path, when the response to said request received from said trust and security management server indicates that said certificate is valid.

2. The method of claim 1, further comprising:
   sending, from said mobile device to said trust and security management server, a query for permission to trust an issuer certificate corresponding to said certificate.

3. The method of claim 1, wherein said trust and security management server validates said certificate using at least one of Online Certificate Status Protocol (OCSP), Certificate Revocation Lists (CRL), or Delegated Path Validation (DPV) protocols to validate said certificate.

4. The method of claim 1, wherein said mobile device primarily communicates with said public network through said primary network path.

5. A non-transitory computer-readable medium storing a computer program comprising computer-executable instructions for initiating secure communication between a mobile device and a web server of a public network, wherein the instructions when executed cause a processor of the mobile device to perform operations comprising:
   receiving a certificate at said mobile device from said web server through a primary network path connecting the mobile device to said public network, said primary network path including a firewall configured to interfere with operation of a domain name system (DNS) sever of the public network when the DNS server is validating the certificate, wherein the firewall is configured to interfere with operation of the DNS server by at least one of:
   modifying the certificate received from the mobile device to change an internet protocol (IP) address of an online certificate status protocol (OSCP) server of the public network;
   limiting access to the OCSP server when receiving a request for OCSP validation of the certificate from the DNS server;

limiting access to the DNS server when querying for the IP address of the OSCP server;

modifying a response from the DNS server when querying the DNS server for the IP address of the OSCP server; or returning an incorrect IP address for the OSCP server to the mobile device when querying the DNS server for the IP address of the OSCP server;

sending, from said mobile device, a request to a trust and security management server to validate said certificate, wherein said trust and security management server is configured to validate said certificate by communicating with a DNS server of said public network through a separate secondary network path that is different than the primary network path;

receiving, at said mobile device, a response to said request from said trust and security management server, said response indicating whether said certificate is valid; and establishing, at said mobile device, secure communications between said mobile device and said web server, through said primary network path, when the response to said request received from said trust and security management server indicates that said certificate is valid.

6. The non-transitory computer-readable medium of claim 5, wherein the operations further comprises sending, from said mobile device, a query to said trust and security management server for permission to trust an issuer certificate corresponding to said certificate.

7. The non-transitory medium of claim 5, wherein said trust and security management server validates said certificate using at least one of Online Certificate Status Protocol (OCSP), Certificate Revocation Lists (CRL), or Delegated Path Validation (DPV) protocols to validate said certificate.

8. A system comprising:

a public network comprising a web server, a domain name system (DNS) server, and an online certificate status protocol (OCPS) server;

a mobile device in communication with the web server and the DNS server of the public network through a primary network path to receive a certificate, the primary network path including a firewall configured to interfere with operation of the DNS server when the DNS server is validating the certificate, wherein the firewall is configured to interfere with operation of the DNS server by at least one of:

modifying the certificate received from the mobile device to change an internet protocol (IP) address of an online certificate status protocol (OSCP) server of the public network;

limiting access to the OCSP server when receiving a request for OCSP validation of the certificate from the DNS server;

limiting access to the DNS server when querying for the IP address of the OSCP server;

modifying a response from the DNS server when querying the DNS server for the IP address of the OSCP server; or returning an incorrect IP address for the OSCP server to the mobile device when querying the DNS server for the IP address of the OSCP server;

a private network comprising a trust and security management server, the trust and security management server in communication with the public network through a separate secondary network path that is different than the primary network path and in communication with the mobile device through a wireless network, wherein the trust and security management server is configured to:

receive a request from the mobile device through the wireless network to validate the certificate;

communicate with the DNS server of public network through the secondary network path to validate the certificate; and send to the mobile device, a response to said request, said response indicating whether said certificate is valid;

wherein the mobile device is configured to establish secure communications between said mobile device and said web server, through said primary network path, when the response to said request received from said trust and security management server indicates that said certificate is valid.

9. The system of claim 8, wherein the public network is the Internet.

10. The system of claim 8, wherein the firewall is located in a jurisdiction in which a government controls the firewall to interfere with the operation of the DNS server when validating the certificate received from the mobile device.

11. The system of claim 8, wherein the firewall is located in a jurisdiction in which a government controls the firewall to interfere with the operation the OCSP server when validating the certificate received from the mobile device.

12. The system of claim 5, wherein the trust and security management server is configured to remotely manage root certificates stored in the certificate store of the mobile device by periodically communicating updates to root certificates stored the certificate store of the mobile device.

13. The system of claim 8, wherein public network further comprises a certificate authority server configured to transmit a root certificate to the web server for storage on the web server.

14. The system of claim 13, wherein the trust and security management server is configured to send trusted certificates to the mobile device for storage in a certificate store of the mobile device.

15. The system of claim 8, wherein the trust and security management server is configured to remotely manage root certificates stored in a certificate store of the mobile device.

16. The system of claim 8, wherein the trust and security management server is configured to remotely manage root certificates stored in the certificate store of the mobile device by removing root certificates from the certificate store of the mobile device.

17. The system of claim 8, wherein the primary network path further comprises a wireless connection between the wireless network and the mobile device and a connection between the wireless network and the public network.

* * * * *